(12) United States Patent
Clark

(10) Patent No.: US 7,540,639 B2
(45) Date of Patent: Jun. 2, 2009

(54) CROSS BIN ILLUMINATION SYSTEM

(75) Inventor: Roy Clark, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 99 days.

(21) Appl. No.: 11/876,176

(22) Filed: Oct. 22, 2007

(65) Prior Publication Data

US 2009/0103320 A1    Apr. 23, 2009

(51) Int. Cl.
F21V 7/00 (2006.01)
B64D 11/00 (2006.01)
B64D 47/02 (2006.01)
B64F 1/20 (2006.01)
B60Q 1/00 (2006.01)
B60Q 3/00 (2006.01)

(52) U.S. Cl. .................. 362/471; 362/470; 105/334; 244/118.5

(58) Field of Classification Search .............. 362/470, 362/471, 472, 479, 484, 490, 493, 516; 244/118.5; 105/334
See application file for complete search history.

(56) References Cited

U.S. PATENT DOCUMENTS

| 5,108,048 | A | * | 4/1992 | Chang | .................. 244/118.1 |
| 5,129,597 | A | * | 7/1992 | Manthey et al. | .......... 244/118.5 |
| 5,921,670 | A | * | 7/1999 | Schumacher et al. | ........ 362/480 |
| 7,494,255 | B2 | * | 2/2009 | Bryan et al. | ................. 362/471 |

* cited by examiner

*Primary Examiner*—Jacob Y Choi
(74) *Attorney, Agent, or Firm*—Weiss & Moy, P.C.

(57) ABSTRACT

An illumination system for an aircraft passenger cabin has a first illumination source positioned between a ceiling structure and a first row of stowage bins. A first light direction assembly is positioned between the ceiling structure and the first row of stowage bins. The first light direction assembly is used to direct emitted light from the first illumination source onto a face of a luggage bin of a second row of stowage bins. A second light direction assembly is also positioned between the ceiling structure and the first row of stowage bins and is used to direct emitted light from the first illumination source into a passenger cabin. A second illumination source is positioned between the ceiling structure and the first row of stowage bins to illuminate the ceiling structure.

20 Claims, 3 Drawing Sheets

CROSS BIN ILLUMINATION SYSTEM

BACKGROUND

Embodiments of this disclosure relate generally to interior lighting systems, and more particularly, to an interior illumination and lighting system for passenger cabins in commercial passenger airplanes.

The interior configuration, architecture, and illumination of airplanes have become relatively standardized. In general, most passenger aircraft compartments have sidewall members with a plurality of windows, a floor member and a ceiling member or assembly of some type. In addition, pluralities of rows of stowage or storage bins are positioned on the aircraft generally at the position between the sidewalls and the ceilings. For larger twin-aisle aircraft, rows of inboard stowage bins are also positioned over the seats positioned along the center of the passenger cabins.

In the past, conventional passenger illumination systems were based on fluorescent and incandescent light sources. However, light emitting diode (LED) based lighting systems offer several advantages over such conventional systems. These include smaller source size, lower electrical power consumption and longer operating lifetimes. Thus, presently, many passenger cabins are using illumination systems based on LEDs. Such LED based lighting systems have lead to improved configuration, architecture, illumination and aesthetics of passenger space of the aircraft. A key concept that has been developed to achieve the above is cross bin lighting in which the overhead storage bins are illuminated with one color and the ceiling structure between the bins is illuminated with another color. These colors may be varied during flight, but a typical color configuration is white light illumination for the overhead bins and blue light for the ceiling area. The use of multi-colors in cross bin lighting creates a feeling of more space to the passenger. In cross-bin lighting, a general requirement is that the light sources should not be visible to passengers in the cabin.

To achieve the general requirement that the light sources not be visible, in many LED illumination systems, cross bin illumination is achieved by placing the LED sources behind a valence above the storage bins. The basic requirement for hiding these sources is that the lighting sources must be below a plane that extends from the top of one valence to a tangent point along the curve of the opposite overhead bin. However, in certain aircraft, space and height constraints preclude the use of this approach to achieve cross bin lighting.

Therefore, it would be desirable to provide a system and method that overcomes the above problems.

SUMMARY

An illumination system for an aircraft having a ceiling structure and at least a first and second row of stowage bins adjacent to the ceiling structure has a first illumination source positioned between the ceiling structure and the first row of stowage bins. A first light direction assembly is positioned between the ceiling structure and the first row of stowage bins to direct emitted light from the first illumination source onto a face of a luggage bin of the second row of stowage bins. A second light direction assembly is positioned between the ceiling structure and the first row of stowage bins to direct emitted light from the first illumination source into a passenger cabin area of the aircraft. A second illumination source is positioned between the ceiling structure and the first row of stowage bins to illuminate the ceiling structure.

An illumination system for an aircraft having a ceiling structure and at least a first and second row of stowage bins adjacent to the ceiling structure, a valence area formed below a first end of the ceiling structure and above the first row of storage bins and having an opening, the valence area used for housing the illumination system, the illumination system has a first Light Emitting Diode (LED) source positioned in the valence area. A first light direction assembly is positioned in the valence area to direct emitted light from the first LED source through the opening and onto a face of a stowage bin of the second row of stowage bins. A second light direction assembly is positioned in the valence area to direct emitted light from the first LED source through the opening and into a passenger cabin area of the aircraft. A second LED source is positioned in the valence area to illuminate the ceiling structure. A third light direction assembly is positioned in the valence area to direct emitted light from the second LED source onto the ceiling of the aircraft.

An illumination system illumination system for an aircraft having a ceiling structure and at least a first and second row of stowage bins adjacent to the ceiling structure, a valence area formed below a first end of the ceiling structure and above the first row of storage bins, the valence area having an opening, the illumination system has a first Light Emitting Diode (LED) source positioned in the valence area. A first light diffuser is positioned in the valence area to direct the emitted light from the first LED source through the opening and onto the face of the luggage bin of the second row of stowage bins. A second light diffuser is positioned in the valence area to direct the emitted light from the first LED source into the passenger cabin area of the aircraft. A first light director is positioned in the valence area to direct the emitted light from the first LED source to the first light diffuser. A second light director positioned is in the valence area to direct the emitted light from the first LED source to the second light diffuser. A second LED source is positioned in the valence area to illuminate the ceiling structure. A blocking diffuser is positioned in the opening of the valence area to block the emitted light from the first LED source from illuminating the ceiling. A light direction assembly is positioned in the valence area to direct emitted light from the second LED source onto the ceiling of the aircraft.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawing, wherein.

DETAILED DESCRIPTION

Figure 1:
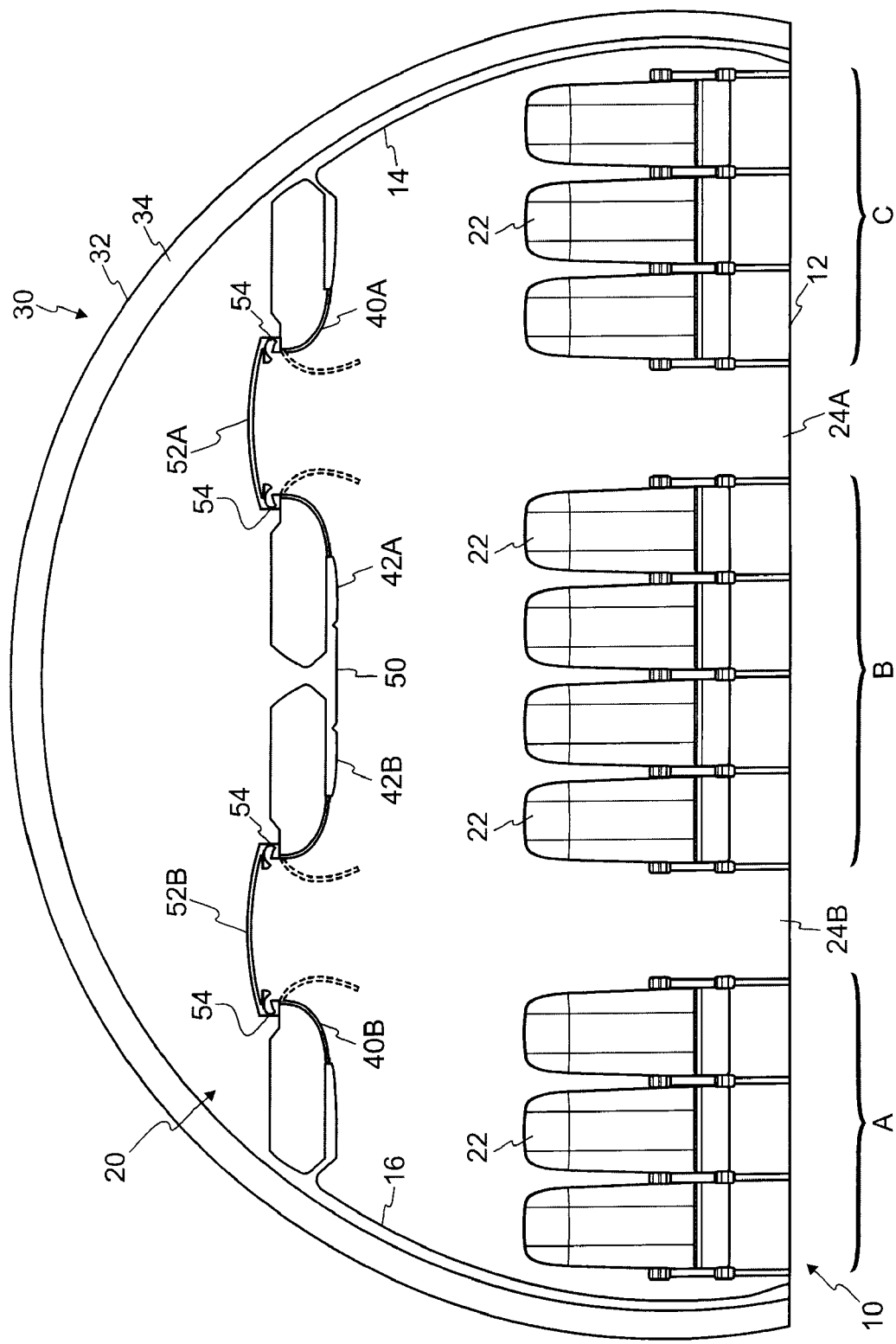
FIG. 1 is a cross section of an aircraft passenger cabin incorporating the cross bin illumination system.

With reference now to FIG. 1, a passenger cabin 10 of a commercial passenger airplane is shown. The passenger cabin 10 has a floor panel 12, a pair of sidewall members or panels 14 and 16, a ceiling panel or structure generally referred to by the reference numeral 20, and a plurality of passenger seats 22. As is common with larger commercial passenger airliners today, the passenger seats in each row are arranged in three sets, A, B, and C, with two aisles 24A and 24B. It should be noted that the number of seats in each set A, B, and C are for illustrative purposes only and should not be seen as to limit the scope.

The exterior of the airplane fuselage is designated by the reference numeral 30. As is typical and conventional with aircraft, an exterior skin 32 is provided which is attached to circular or semi-circular bulkhead members 34. The bulkhead members provide support and stability for the fuselage of the aircraft.

The passenger cabin 10 has a plurality of rows of outboard storage or stowage bins 40A, 40B which are provided generally at the intersection of the sidewall members 14, 16 and the ceiling structure 20. In the embodiment depicted in FIG. 1, the passenger cabin 10 is a twin-aisle passenger cabin. Thus, rows of inboard storage bins 42A and 42B are provided over the central rows of passenger seats B. The storage/stowage bins 40A, 40B, 42A, 42B are hinged relative to the passenger cabin 10 such that they rotate from an up or closed position to a down or open position as shown in dashed lines in FIG. 1. The storage/stowage bins 40A, 40B, 42A, 42B are used for storing luggage, packages, and other personal items of the passengers during flight.

In accordance with the use of the present invention in the passenger cabin shown in FIG. 1, the ceiling system of the aircraft has a central structure 50 in which the two inboard storage/stowage bins 42A, 42B are positioned. A pair of curved ceiling structures 52A and 52B are positioned between the central ceiling structure 50 and the two rows of outboard storage/stowage bins 40A and 40B. Valence areas 54 are formed between each end of the curved ceiling structure 52A and 52B and the storage/stowage bins 40A, 40B, 42A, 42B. The valence area 54 forms a housing in which the cross bin illumination system 56 is positioned.

As stated above, in the past, in order for the cross bin illumination systems to achieve the general requirement that the light sources not be visible, the lighting sources must be below a plane that extends from the top of one valence to a tangent point along the curve of the opposite overhead bin. However, in certain aircraft, space and height constraints preclude the use of this approach to achieve cross bin lighting.

Figure 2:
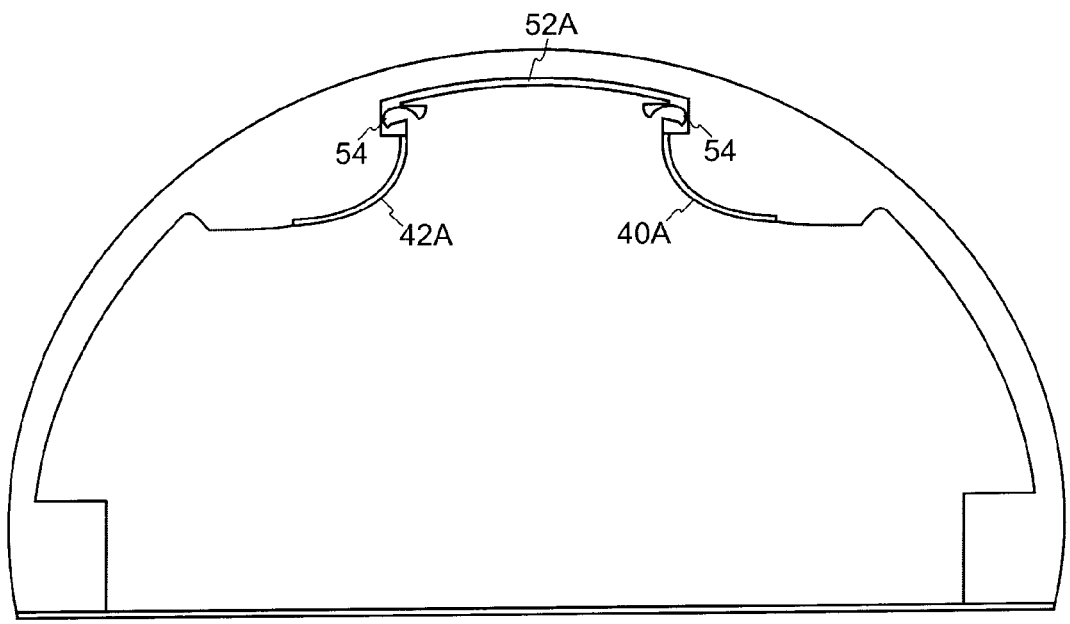
FIG. 2 is a magnified cross sectional view of aircraft passenger cabin showing the general placement of the cross bin illumination system in the valence region above the luggage bins.
Figure 3:
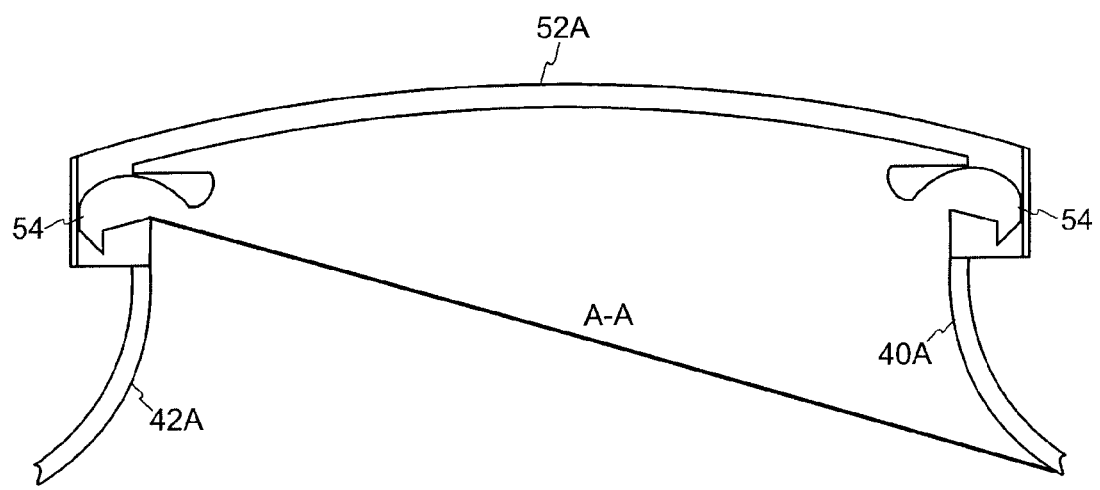
FIG. 3 is a magnified cross sectional view of the aircraft passenger cabin showing the illumination patterns produced by the individual diffuser elements of the cross bin illumination system.

As seen more clearly in FIGS. 2-3, the space configuration and the height of the valence area 54 shown in the Figures does not allow the light source to be positioned below a plane that extends from the top of one valence area to a tangent point along the curve of the opposite overhead bin as shown in line A-A in order to illuminate the overhead storage bins 40A, 40B, 42A and 42B. Thus, this constraint precludes the use of prior art approaches to achieve cross bin lighting.

Figure 4:
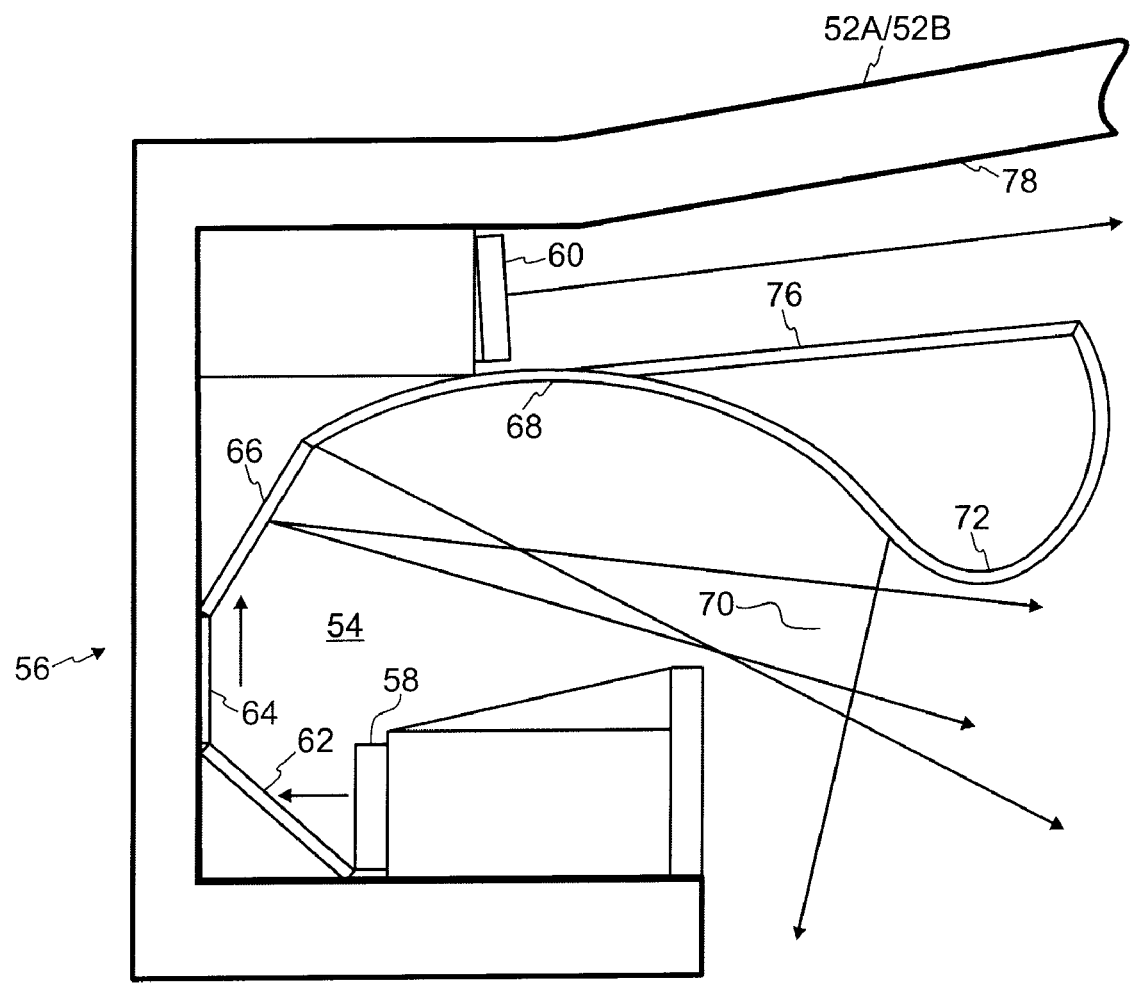
FIG. 4 is a simplified block diagram showing the cross bin illumination system.

Referring now to FIG. 4, the cross bin illumination system 56 is shown which allows the overhead storage bins to be illuminated with one color and the ceiling structure between the bins illuminated with another color. The illumination system 56 accomplishes the above even though the space configuration and the height of the valence area 54 does not allow the light source to be positioned below a plane that extends from the top of the valence area 54 to a tangent point along the curve of the opposite overhead bin as shown in line A-A in order to illuminate the overhead storage bins 40A, 40B, 42A and 42B.

The cross bin illumination system 56 is positioned in the valence area 54 above the luggage bin. The illumination system 56 has a first light source 58 and a second light source 60. In general, the first and second light sources 58 and 60 are Light Emitting Diodes (LEDs). In accordance with one embodiment, the first light source 58 provides a white color light and the second light source 60 provides a blue color light.

As shown, the space configuration and the height of the valence area 54 does not allow the first light source 58 to directly illuminate the overhead storage bins 40A, 40B, 42A, and 42B without being directly visible by passengers/crew of the aircraft. Thus, the first light source 58 is positioned in a bottom area of the valence area 54 below an opening 70 of the valence area 54. This will ensure that the first light source 58 is not directly visible. In accordance with one embodiment, the first light source 58 is attached vertically to a side of the valence area 54. However, this is only shown as an example and should not be seen as to limit the scope. The first light source 58 may be attached in different locations in the bottom area of the valence area 54. For example, the first light source 58 may be positioned horizontally and direct the light in an upward manner. The first light source 58 only needs to be positioned in the bottom area of the valence area 54 below the opening 70 so that the first light source 58 will not be directly visible.

The light from the first light source 58 needs to be redirected in order to properly illuminate the overhead storage bins 40A, 40B, 42A, and 42B and other areas of the aircraft. One or more light direction assemblies are generally used to redirect and focus the light onto certain areas of the passenger cabin 10. In accordance with one embodiment, the light direction assemblies use one or more optical devices to redirect the light from the first light source 58 and one or more light diffusers to focus the light. The number of optical devices and light diffusers used is dependent on how many different areas the first light source 58 is used to illuminate. The optical devices may be mirrors, panels having reflective surfaces/coatings, and the like. The light diffusers may be a focusing lens, film, acrylic, or the like. The listing of the above is given as an example and should not be seen as to limit the scope.

In the embodiment depicted in FIG. 4, a pair of optical devices 62 and 64 is used to redirect the light from the first light source 58. The optical devices 62 and 64 are used to redirect the light from the first light source 58 to a first diffuser 66 and a second diffuser 68 respectively. The first diffuser 66 is used to direct the light from the optical device 62 through an aperture 70 of the valence area 54 to illuminate the luggage bin face across from the valence area 54. In accordance with one embodiment, the first diffuser 66 is a narrow angle diffuser. A narrow angle diffuser has the ability to direct the light only on the luggage bin face across from the valence area 54. The narrow angle diffuser can control the light in order to direct it onto the face of the luggage bins while preventing light from shining under the luggage bins.

The second diffuser 68 is used to direct the light from the optical device 64 through the aperture 70 to provide general diffuse light to the passenger cabin area. In accordance with one embodiment, the second diffuser 68 is a wide angle diffuser. The wide angle diffuser has the ability to scatter the light to provide general diffuse light to the passenger cabin area.

The cross bin illumination system 56 may use a blocking diffuser 72. The blocking diffuser 72 is positioned on an upper surface of the aperture 70. The blocking diffuser 72 is used to block the diffuse light from the first light source 58 from illuminating the ceiling area.

The second light source 60 is positioned in an upper area of the valence area 54. The second light source 60 is used to illuminate the ceiling structure 52A and/or 52B of the aircraft. In general, the second light source 60 is an LED. In accordance with one embodiment, the second light source 60 provides a blue color light to emulate the sky. This "blue sky effect" creates a feeling of a more spacious passenger cabin.

In the embodiment shown in FIG. 4, the second light source 60 is positioned in the valence area 54 so that the second light source 60 is positioned above the second diffuser 68. Light from the second light source 60 is directed in part to optical surfaces 76 and 78. The optical surfaces 76 and 78 act to direct the light from the second light source 60 onto the ceiling to provide a uniform illumination of the ceiling without areas of significantly different intensities. The optical surface 78 may be part of the ceiling surface, or separate optical element. The optical surfaces 76 and 78 may be a mirror, a surface having a reflective material, and the like. The listing of the above is given as an example and should not be seen as to limit the scope.

It should be noted that a wide range of optical combinations of light scattering and reflective surfaces may be used to achieve various embodiments of this invention. Furthermore, instead of using simple diffusing surfaces, the diffuser assemblies may contain diffractive or holographic optical elements, or incorporate backlighting or Micro Electronic Mirror (MEMs) technology to control the angular properties of the illumination beam.

While embodiments of the disclosure have been described in terms of various specific embodiments, those skilled in the art will recognize that the embodiments of the disclosure can be practiced with modifications within the spirit and scope of the claims.

What is claimed is:

1. An illumination system for an aircraft having a ceiling structure and at least a first and second row of stowage bins adjacent to the ceiling structure, the illumination system comprising:
    a first illumination source positioned between the ceiling structure and the first row of stowage bins;
    a first light direction assembly positioned between the ceiling structure and the first row of stowage bins to direct emitted light from the first illumination source onto a face of a luggage bin of the second row of stowage bins;
    a second light direction assembly positioned between the ceiling structure and the first row of stowage bins to direct emitted light from the first illumination source into a passenger cabin area of the aircraft; and
    a second illumination source positioned between the ceiling structure and the first row of stowage bins to illuminate the ceiling structure.

2. An illumination system in accordance with claim 1 wherein a valence area is formed below a first end of the ceiling structure and above the first row of storage bins and having an opening, the valence area used for housing the illumination system.

3. An illumination system in accordance with claim 1 further comprising a third light direction assembly positioned between the ceiling structure and the first row of stowage bins to direct emitted light from the second illumination source onto the ceiling of the aircraft.

4. An illumination system in accordance with claim 1 further comprising a blocking diffuser positioned between the ceiling structure and the first row of stowage bins to block the emitted light from the first illumination source from illuminating the ceiling.

5. An illumination system in accordance with claim 1 wherein the first light direction assembly comprises a first light diffuser to direct the emitted light from the first illumination source onto the face of the luggage bin of the second row of stowage bins.

6. An illumination system in accordance with claim 5 wherein the first light direction assembly further comprises a first light director to direct the emitted light from the first illumination source to the first light diffuser.

7. An illumination system in accordance with claim 5 wherein the first light diffuser is a narrow angle diffuser.

8. An illumination system in accordance with claim 1 wherein the second light direction assembly comprises a second light diffuser to direct the emitted light from the first illumination source into the passenger cabin area of the aircraft.

9. An illumination system in accordance with claim 8 wherein the second light direction assembly further comprises a second light director to direct the emitted light from the first illumination source to the second light diffuser.

10. An illumination system in accordance with claim 8 wherein the second light diffuser is a wide angle diffuser.

11. An illumination system in accordance with claim 3 wherein the third light direction assembly comprises optical surfaces to direct the emitted light from the second illumination source onto the ceiling of the aircraft.

12. An illumination system in accordance with claim 1 wherein the first illumination source and the second illumination source are Light Emitting Diodes (LEDs).

13. An illumination system in accordance with claim 1 wherein the first illumination source emits a white light.

14. An illumination system in accordance with claim 1 wherein the second illumination source emits a blue light.

15. An illumination system for an aircraft having a ceiling structure and at least a first and second row of stowage bins adjacent to the ceiling structure, a valence area formed below a first end of the ceiling structure and above the first row of storage bins and having an opening, the valence area used for housing the illumination system, the illumination system comprising:
    a first Light Emitting Diode (LED) source positioned in the valence area;
    a first light direction assembly positioned in the valence area to direct emitted light from the first LED source through the opening and onto a face of a stowage bin of the second row of stowage bins;
    a second light direction assembly positioned in the valence area to direct emitted light from the first LED source through the opening and into a passenger cabin area of the aircraft;
    a second LED source positioned in the valence area to illuminate the ceiling structure; and
    a third light direction assembly positioned in the valence area to direct emitted light from the second LED source onto the ceiling of the aircraft.

16. An illumination system in accordance with claim 15 wherein the first light direction assembly comprises:
    a first light diffuser to direct the emitted light from the first LED source through the opening and onto the face of the luggage bin of the second row of stowage bins; and
    a first light director to direct the emitted light from the first LED source to the first light diffuser.

17. An illumination system in accordance with claim 15 wherein the second light direction assembly comprises:
    a second light diffuser to direct the emitted light from the first LED source into the passenger cabin area of the aircraft; and
    a second light director to direct the emitted light from the first LED source to the second light diffuser.

18. An illumination system in accordance with claim 15 wherein the third light direction assembly comprises optical surfaces to direct the emitted light from the second LED source onto the ceiling of the aircraft.

19. An illumination system in accordance with claim 15 further comprising a blocking diffuser positioned in the valence area to block the emitted light from the first LED source from illuminating the ceiling.

20. An illumination system for an aircraft having a ceiling structure and at least a first and second row of stowage bins adjacent to the ceiling structure, a valence area formed below a first end of the ceiling structure and above the first row of storage bins, the valence area having an opening, the illumination system comprising:

a first Light Emitting Diode (LED) source positioned in the valence area;

a first light diffuser positioned in the valence area to direct the emitted light from the first LED source through the opening and onto the face of the luggage bin of the second row of stowage bins;

a second light diffuser positioned in the valence area to direct the emitted light from the first LED source into the passenger cabin area of the aircraft;

a first light director positioned in the valence area to direct the emitted light from the first LED source to the first light diffuser;

a second light director positioned in the valence area to direct the emitted light from the first LED source to the second light diffuser;

a second LED source positioned in the valence area to illuminate the ceiling structure;

a blocking diffuser positioned in the opening of the valence area to block the emitted light from the first LED source from illuminating the ceiling; and a light direction assembly positioned in the valence area to direct emitted light from the second LED source onto the ceiling of the aircraft.

\* \* \* \* \*